(12) United States Patent
Yeh et al.

(10) Patent No.: US 7,803,876 B2
(45) Date of Patent: Sep. 28, 2010

(54) PROCESSES FOR PRODUCING POLYMER BLENDS AND POLYMER BLEND PELLETS

(75) Inventors: Richard Cheng-Ming Yeh, Bellaire, TX (US); Sudhin Datta, Houston, TX (US)

(73) Assignee: ExxonMobil Chemical Patent Inc., Houston, TX (US)

( * ) Notice: Subject to any disclaimer, the term of this patent is extended or adjusted under 35 U.S.C. 154(b) by 747 days.

(21) Appl. No.: 11/333,093

(22) Filed: Jan. 17, 2006

(65) Prior Publication Data

US 2006/0170137 A1 Aug. 3, 2006

Related U.S. Application Data

(60) Provisional application No. 60/649,074, filed on Jan. 31, 2005.

(51) Int. Cl.
- C08J 3/00 (2006.01)
- C08F 8/00 (2006.01)
- C08L 23/00 (2006.01)
- C08L 23/04 (2006.01)
- B28B 1/26 (2006.01)

(52) U.S. Cl. ................. 525/198; 525/191; 525/240; 525/197; 264/86; 264/87; 264/102; 264/349; 528/501

(58) Field of Classification Search ........... 525/197, 525/198, 191, 240; 264/86, 87, 102, 349; 528/501

See application file for complete search history.

(56) References Cited

U.S. PATENT DOCUMENTS

| | | | |
|---|---|---|---|
| 2,950,267 A * | 8/1960 | Thompson et al. ........... 525/240 |
| 3,090,767 A * | 5/1963 | Colgan et al. ............... 525/198 |
| 3,248,179 A | 4/1966 | Norwood |
| 3,299,186 A * | 1/1967 | Wallace ....................... 525/197 |
| 3,494,985 A * | 2/1970 | Porter et al. ................. 524/409 |
| 3,839,503 A * | 10/1974 | Kahle et al. ................. 525/198 |
| 3,851,014 A * | 11/1974 | Dalton ......................... 525/86 |
| 3,878,153 A * | 4/1975 | Driscoll ....................... 523/328 |
| 4,065,532 A * | 12/1977 | Wild et al. ..................... 264/68 |
| 4,107,422 A * | 8/1978 | Salmon .................. 528/502 C |
| 4,138,375 A * | 2/1979 | Berg et al. ................... 523/334 |
| 4,380,607 A * | 4/1983 | Ikeda et al. .................. 525/232 |
| 4,540,753 A | 9/1985 | Cozewith et al. |
| 4,543,399 A | 9/1985 | Jenkins, III et al. |
| 4,547,549 A * | 10/1985 | Nakamura et al. .......... 525/197 |
| 4,588,790 A | 5/1986 | Jenkins, III et al. |
| 4,613,484 A | 9/1986 | Ayres et al. |
| 4,808,262 A * | 2/1989 | Aneja et al. ................. 159/47.1 |
| 5,001,205 A | 3/1991 | Hoel |
| 5,028,670 A | 7/1991 | Chinh et al. |
| 5,034,463 A * | 7/1991 | Brokken-Zijp et al. ...... 525/185 |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,504,172 A | 4/1996 | Imuta et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 5,693,727 A | 12/1997 | Goode et al. |
| 5,712,352 A | 1/1998 | Brant et al. |
| 5,994,483 A * | 11/1999 | Bruck et al. ................... 526/67 |
| 6,111,021 A * | 8/2000 | Nakahama et al. .......... 525/232 |
| 6,150,432 A * | 11/2000 | Jones et al. ................. 523/105 |
| 6,207,756 B1 | 3/2001 | Datta et al. |
| 6,319,998 B1 | 11/2001 | Cozewith et al. |
| 6,525,157 B2 | 2/2003 | Cozewith et al. |
| 6,635,715 B1 | 10/2003 | Datta et al. |
| 6,642,316 B1 * | 11/2003 | Datta et al. ................. 525/240 |
| 6,770,714 B2 | 8/2004 | Ommundsen et al. |
| 6,881,800 B2 | 4/2005 | Friedersdorf |
| 6,960,635 B2 | 11/2005 | Stevens et al. |
| 2002/0078793 A1 * | 6/2002 | Holl et al. ...................... 75/230 |

FOREIGN PATENT DOCUMENTS

EP    325778 A2 *  8/1989

(Continued)

OTHER PUBLICATIONS

H.N. Cheng, "$^{13}$C NMR Analysis of Ethylene-Propylene Rubbers," *Macromolecules*, vol. 17, pp. 1950-1955 (1984).

(Continued)

*Primary Examiner*—Vasu Jagannathan
*Assistant Examiner*—Irina Krylova (57) ABSTRACT

Processes for producing blends of a first polymer component and a second polymer component are provided. The first polymer component and the second polymer component are blended in an internally agitated mixer such as a devolatizer in the presence of at least one solvent. Blending the polymers in this manner results in an intimate mixing of the first and second polymers, providing beneficial performance characteristics. In one embodiment, the first polymer incorporates at least 75 wt. % of propylene-derived units wherein the propylene-derived units have an isotactic triad fraction of about 65% to about 99% and wherein the first polymer has a heat of fusion of less than 75 J/g. In this embodiment, the second polymer is selected from polypropylenes, low density polyethylenes, high density polyethylenes, polystyrenes, polyamides, polycarbonates, and polyesters. Pellets of such polymer blends exhibit beneficial elasticity properties of the first polymer component while exhibiting a reduced tendency to agglomerate.

20 Claims, 1 Drawing Sheet

FOREIGN PATENT DOCUMENTS

| | | |
|---|---|---|
| EP | 0 634 421 | 1/1995 |
| EP | 0 794 200 | 9/1997 |
| EP | 0 802 202 | 10/1997 |
| JP | 11279397 A * | 10/1999 |
| JP | 2002308959 A * | 10/2002 |
| WO | WO 96/08520 | 3/1996 |
| WO | WO 96/33227 | 10/1996 |
| WO | WO 97/22639 | 6/1997 |
| WO | WO 02/34795 | 5/2002 |
| WO | WO 2004/014998 | 2/2004 |
| WO | WO 2004058480 * | 7/2004 |

OTHER PUBLICATIONS

Rodriguez, F., "Principles of Polymer Systems," 3rd ed., Hemisphere Pub. Corp., NY, pp. 155-160 (1989).

Slade, P. E. Ed., Polymer Molecular Weights Part II, Marcel Dekker, Inc., NY, pp. 287-368 (1975).

Ver Strate et al., "Near Monodisperse Ethylene-Propylene Copolymers by Direct Ziegler-Natta Polymerization, Preparation, Characterization, Properties," *Macromolecules*, vol. 21, pp. 3360-3371 (1988).

Wheeler et al., "Gel Permeation Chromatography/Fourier Transform Infrared Interface for Polymer Analysis," *Applied Spectroscopy*, vol. 47, No. 8, pp. 1128-1130 (1993).

* cited by examiner

FIG. 1

PROCESSES FOR PRODUCING POLYMER BLENDS AND POLYMER BLEND PELLETS

CROSS REFERENCE TO RELATED APPLICATION

This application claims the benefit of Provisional Application No. 60/649,074 filed Jan. 31, 2005, the disclosure of which is incorporated by reference.

FIELD OF THE DISCLOSURE

This disclosure relates to processes for producing polymer blends and pellets produced from the polymer blends.

BACKGROUND INFORMATION

It is known that two or more polymeric materials may be blended to achieve beneficial performance characteristics in the resulting polymeric composition. One such conventional blending process is the blending of elastomeric and thermoplastic polymeric materials. For example, U.S. Pat. No. 6,642,316 to Datta, et al. discloses blending ethylene propylene based interpolymers with polypropylene to provide a polypropylene dispersed phase and an elastomeric continuous matrix phase. The overall blend may be elastomeric in nature. The ethylene propylene based interpolymers may be of the type described in U.S. Pat. No. 6,525,157 to Cozewith, et al.

Various methods of producing polymeric blends are known. U.S. Pat. No. 6,207,756 to Datta, et al. describes a process for producing a blend of discontinuous phase of a semi-crystalline plastic and a continuous phase of an amorphous elastomer. The blends are produced in series reactors by producing a first polymer component in a first reactor and directing an effluent of the first reactor to a second reactor and producing the second polymer component in solution in the second reactor in the presence of the first polymeric component. U.S. Pat. No. 6,319,998 to Cozewith, et al. also discloses using series solution polymerizations to produce polymer blends. The polymer components of the blends are ethylene copolymers. U.S. Pat. No. 6,770,714 to Ommundsen, et al. discloses the use of parallel polymerizations to produce different polymeric components that are then blended through extrusion of solid finished products or using other conventional mixing equipment. One polymeric component is a propylene homopolymer or copolymer and the second polymeric component is an ethylene copolymer.

U.S. Pat. No. 6,635,715 to Datta, et al. discloses the production of physical polymer blends through blending a first polymer component that is a propylene homopolymer or copolymer and second polymer component that is propylene-alpha olefin copolymer including 5 wt. % to 25 wt. % of the alpha olefin. The polymeric components are blended by mechanical means such as melt pressing.

SUMMARY OF THE DISCLOSURE

This disclosure relates to processes for producing polymer blends comprising at least one first polymer and at least one second polymer and processes for producing such blends. The blends of the first polymer and the second polymer are produced by combining the polymers to form a blend of the first and second polymer in the presence of at least one solvent in an internally agitated mixing means and then removing at least a portion of the solvent while the polymer blend is in the internally agitated mixing means. Combining the polymers in this manner results in an intimate mixing of the first and second polymers, leading to beneficial performance characteristics of the resulting polymer blends. In certain embodiments, pellets produced from the polymer blends exhibit beneficial storage and handling characteristics.

In certain embodiments, the first polymer incorporates at least 75 wt. % of propylene-derived units wherein the propylene-derived units have an isotactic triad fraction by $^{13}C$ NMR of about 65% to about 99% and wherein the first polymer has a heat of fusion of less than 75 J/g. In these embodiments, the second polymer may be selected from polypropylenes, low density polyethylenes, high density polyethylenes, polystyrenes, polyamides, polycarbonates, and polyesters. Polymers suitable for selection as the second polymer component are semicrystalline or crystalline with melting points as determined by DSC of greater than 100° C. in certain embodiments, greater than 125° C. in other embodiments, or greater than 150° C. in still other embodiments. Such polymer blends retain the elastic, hystereritic, and elongation properties of the first polymer component while exhibiting rapid crystallization after production. In particular, pelletization of the polymer blends through conventional finishing techniques provides pellets that attain a high degree of crystallization within a relatively short period of time, upon cooling of the pellets, as compared to pellets produced from the first polymer alone. Pellets produced from the polymer blends exhibit reduced storage and handling problems associated with low crystallinity propylene polymers. The change in the degree of crystallinity of the blend compared to the crystallinity of the first polymer component is measured and quantified by the absolute and relative changes in the mechanical hardness (Shore hardness) of the polymer blends and first polymer.

In one embodiment, the first polymer is elastic and the blend of the first polymer component and the second polymer component does not lead to substantial deterioration in the elastic properties of the first polymer. Elasticity of the first polymer or the blends of the first polymer and the second polymer described herein is designated by a tension set, in the tensile direction, on the second elongation from an extension of 200%, of less than 40%, less than 30%, or less than 20%.

Certain of the embodiments of the processes described herein are directed to the development of crystallinity of the blends of the first polymer and the second polymer component when the resultant blend or pellets produced from the blends are maintained at temperature below 25° C., below 20° C., below 15° C., or below 10° C. until the crystallization of the blend or pellet reaches a level such that the Shore A hardness of the blend is at least 35. Generally, such Shore A harness levels may be reached within 180 minutes, often within much shorter time periods.

DETAILED DISCLOSURE

This disclosure relates to processes for producing blends of at least one first polymer component and at least one second polymer component exhibiting a variety of beneficial performance characteristics. For purposes of the disclosure, references to the first polymer and the second polymer in a blend, unless otherwise indicated, shall encompass one or more first polymers as described herein and one or more second polymers as described herein. This disclosure also relates to pellets produced from such blends as well as processes for producing the blends and pellets. The blends of the first polymer and the second polymer are produced by combining the polymers in molten state in the presence of at least one solvent in an internally agitated mixing means to form a blend of the polymers and then removing at least a portion of the solvent from the blend while the blend is in the internally agitated mixing means.

For purposes of this disclosure, an internally agitated mixing means or internally agitated mixer is a device capable of forming a blend of the first polymer and the second polymer by combining the polymers in molten and/or solution states in the presence of a solvent within the device through agitation. Additionally, the internally agitated mixing means has the capability of removing at least a portion of the solvent while the blend is in the mixing means. Agitation within the internally agitated mixing means may occur through mixing, stirring, shaking, oscillation, vibration, rotating, and/or tumbling. In certain embodiments, the internally agitated mixing means may also be internally heated. Removal of the solvent from the internally agitated mixing means may be accomplished by any suitable means. Generally, the solvent is removed by venting or by applying a reduced pressure to the internally agitated mixing means. In certain embodiments, the internally agitated mixing means evaporates the solvent from the polymer components and blends under vacuum. In certain embodiments, the internally agitated mixing means incorporates internal rotating agitation elements, capable of blending the two polymer components. Exemplary internally agitated mixing means include both single and twin screw extruders, internal batch mixers such as Banbury mixers, static mixers, and devolatizers which remove solvent from polymers by heating with agitation under an applied vacuum such as film and polymer devolatizer. The devices may incorporate rotating screws, mixing paddles, and stationary hooks.

In certain embodiments, a vacuum force is applied to the internally agitated mixing means and may be from a lower limit of 0.01 kPa to a higher limit of 150 kPa. The lower limit may be less than 0.1 kPa, less than 0.5 kPa, less than 0.8 kPa, less than 1 kPa, less than 2 kPa, or less than 3 kPa. The higher limit for the vacuum force may be less than 5 kPa, less than 7 kPa. In a particular embodiment, the vacuum force may range from about 2.66 kPa to about 6.66 kPa, less than 10 kPa, less than 20 kPa, less than 50 kPa, or less than 100 kPa. In one embodiment, the internally agitated mixing means is a devolatizer. Exemplary devolatizers are produced by LIST USA, INC. in Charlotte, N.C.

The amount of solvent removed from the internally agitated mixing means may vary over a wide range. Generally, at least 30 wt. % of the at least one solvent present in the blend is removed. In certain embodiments, from about 30 wt. % to about 99 wt. % of the at least one solvent is removed. In other embodiments, from about 40 wt. % to about 90 wt. % of the at least one solvent is removed. In still other embodiments, from about 50 wt. % to about 80 wt. % of the at least on solvent is removed from the internally agitated mixing means. In certain embodiments, the amount of the at least one solvent remaining in the polymer blends after removal of the blends from the internally agitated mixing means is less than about 10 wt. %, more preferably less than about 5 wt. %, more preferably less than about 3 wt. %, more preferably less than about 2 wt. %, more preferably less than about 1 wt. %, more preferably less than about 0.5 wt. %, and most preferably less than about 0.1 wt. % of the combined weights of the first polymer and the second polymer.

The polymer blends produced in the internally agitated mixing means may be processed through a die, in the molten state, to form a strand of the polymer blend. The die may contain a plurality of holes to manufacture a plurality of strands. At the exit of the die, the strand may be intermittently cut to produce pellets of the polymer blend of desired sizes. For purposes of this disclosure, the term "polymer pellet" generally refers to polymer particles having a variety of shapes such as spheres, cylinders, and disks. Generally, the sizes of such pellets in a first dimension ranges from about 2 mm to about 10 mm and from about 2 mm to about 10 mm in a second dimension. For example, in certain embodiments, the pellets may be approximately spherical with diameters ranging from about 2 mm to about 10 mm. In other embodiments, the pellets may be disk-shaped with diameters ranging from about 2 mm to about 10 mm and thickness ranging from about 2 mm to about 10 mm. In still other embodiments, the pellets may be cylindrical with diameters from about 2 mm to about 10 mm with lengths of about 2 mm to about 10 mm. In other embodiments, the first and second dimensions of the polymer pellets may range from about 2 mm to about 8 mm. In still other embodiments, the first and second dimensions of the polymer pellets may range from about 2 mm to about 4 mm.

Pellets produced from the polymer blends described herein may also be "dusted" with an anti-stick agent to help reduce agglomeration. An anti-stick agent is typically a powder. Exemplary anti-stick agents of are selected from waxes, polyethylenes, polypropylenes, talc, calcium stearate, and mixtures thereof. The anti-stick agent level will generally range from about 100 parts per million ("ppm"), based on the weight of the polymer blend, to about 8,000 ppm. In other embodiments, the anti-stick agent will be present in the range of about 500 ppm to about 7,000 ppm. In still other embodiments, the anti-stick agent will be present in the range of from about 1,000 ppm to about 5,000 ppm. Most preferred is a range of from about 1,000 ppm to about 4,000 ppm.

The processes described herein are particularly useful for producing blends of polymers incorporating a predominate amount of a first polymer that is a low crystallinity polymer incorporating propylene-derived units. Low crystallinity polymers are valued for elastic, hystreritic and elongation characteristics provided by the nature of the polymers. However, the neat form of such low crystallinity polymers may exhibit storage and handling problems resulting from agglomeration of pellets of the polymers.

It is believed that agglomeration of the pellets results from deformation of the polymer pellets during storage and handling of the pellets during the first few hours or days following production of the pellets. Specifically, upon production, polymer pellets generally have shapes that are spherical, cylindrical, disk-like, or other shapes in which the outer surface of the pellets are curved as opposed to flat surfaces. Generally, polymer pellets are free-flowing as the curved surfaces of the pellets slide freely past each other. However, it has been discovered, that under certain circumstances, the curved pellet surfaces may become flattened during storage as a result of the pellets pressing against each other, especially when stored in containers with significant vertical dimensions or when they are maintained at temperatures near or above ambient (21° C.) When this flattening of the surfaces of the polymer pellets occurs, the ability of the pellet surfaces to slide past each other is restricted, which may lead to agglomeration.

It has been surprisingly determined that by increasing the rate of crystallization of the polymeric material of the polymer pellets, flattening of the surfaces of the pellets is less likely to occur and the pellets can become hard in the course of conventional polymer finishing steps to provide free-flowing pellets, even after the pellets are stored for long periods of time at high ambient temperatures.

Flattening of the surfaces of the pellets is more likely to occur when the polymers making up the pellets are in a state of low crystallization as compared to higher states of crystallization. This occurs because the lower crystallization state polymers are generally more malleable, or soft, as compared to higher crystallization state polymers. Certain polymers, especially low crystallinity polymers, may take as long as 1 hour, and typically longer periods such as periods of more than 3 hours, more than 8 hours, more than 24 hours, and in some instances more than 72 hours are necessary to achieve a high crystallization states following production of a pellet containing only the first low crystallinity polymer component. Conversely, it has been discovered that certain polymers, especially high crystallinity polymers, may attain a state of high crystallization as quickly as 1 minute, as quickly as 3 minutes, as quickly as 10 minutes, as quickly as 60 minutes, or in some instances in 180 minutes following production of a pellet from the high crystallinity polymers.

The level of crystallization of the polymers may be determined by measuring the hardness of the polymer pellets. Generally, it has been determined, in various embodiments, that Shore A Hardness (ASTM 2240) values of at least 35, at least 40, at least 45, at least 50, at least 55, or at least 60 are necessary to prevent polymer pellets from flattening during storage and to prevent agglomeration of the pellets. While pellets made from many low crystallinity polymers may achieve the same level of hardness following production, it may take days before this level of hardness is attained as the pellets crystallize over time. During the period in which the pellets are attaining a high level of crystallinity, the pellets tend to agglomerate and/or exhibited resisted flow.

The processes described herein speed the rate of crystallization of the polymer pellets to provide a hardness that enables the pellets to flow freely, even after long storage periods.

In certain embodiments of the processes and blends described herein, a first polymer component having low crystallinity is blended with a second polymer component having high crystallinity to produce a polymer blends and pellets of polymer blends that will achieve a state of crystallization sufficient to provide a Shore A harness of at least 35, at least 40, at least 45, at least 50, at least 55, and at least 60 in a time of less than 1 minute, less than 3 minutes, less than 10 minutes, less than 60 minutes, or less than 180 minutes following removal of the polymer blend from the internally agitated mixing means, or following production of the pellets, when the blends and polymer pellets are maintained at an ambient temperature of 10° C. to 40° C. The time periods required to achieve these levels of crystallization is much less as compared to polymeric material or pellets produced from the low crystallinity first polymer alone. While not wishing to bound by theory, the rapid rate of crystallization of the blends comprising the first polymer and second polymer may arise not only from the crystallization of the second polymer but also, principally, from the crystallinity induced in the first polymer by the presence of the second polymer.

In certain embodiments, the first polymer exhibits elastic properties and blending of the second polymer with the first polymer produces a blend having elastic properties that are not substantially lower than the elastic properties of the first polymer. However, in general the second polymer is inelastic and the admixture of the second polymer into the first leads to some loss of elasticity. Elasticity is defined as (100—tension set) where the tension set is defined as a percentage and is measured as the fractional increase in length only on the second extension, each extension being to a 200% extension. In certain embodiments, elasticity of the first polymer and the blends of the first polymer and the second polymer described herein are designated by a tension set of less than 40%. In other embodiments, the tension set of the first polymer and the blends is less than 30% or less than 20%. Certain embodiments are directed to the development of crystallinity of the blend of the first polymer and the second polymer component when the resultant blend is maintained at temperature below 25° C., below 20° C., or below 15° C. until the crystallization of the composite is substantially complete.

In one embodiment, the first polymer of the blend is a low crystallinity polymer incorporating propylene-derived units. Such polymers may be produced by copolymerizing propylene with other alpha-olefins such as ethylene. However, it is possible to produce such polymers that propylene homopolymers through controlled disruption of the crystallinity of the polymer backbone though the use of certain catalyst systems and polymerization conditions.

In other embodiments, the polymer pellets are dusted with an anti-stick agent to produce polymer pellets exhibiting unique performance properties not previously seen with polymer pellets produced from polymer composition blends.

As discussed above, in accordance with the processes described herein, the first polymer and the second polymer are combined or blended in an internally agitated mixing means. The first polymer and the second polymer are blended in an internally agitated mixing means to provide intimate mixing of the polymers. In one embodiment, the first polymer is directed to the internally agitated means as part of the finishing process for producing the first polymer and the second polymer is directed to the internally agitated mixing means as a molten stream from an extruder means.

Figure 1:
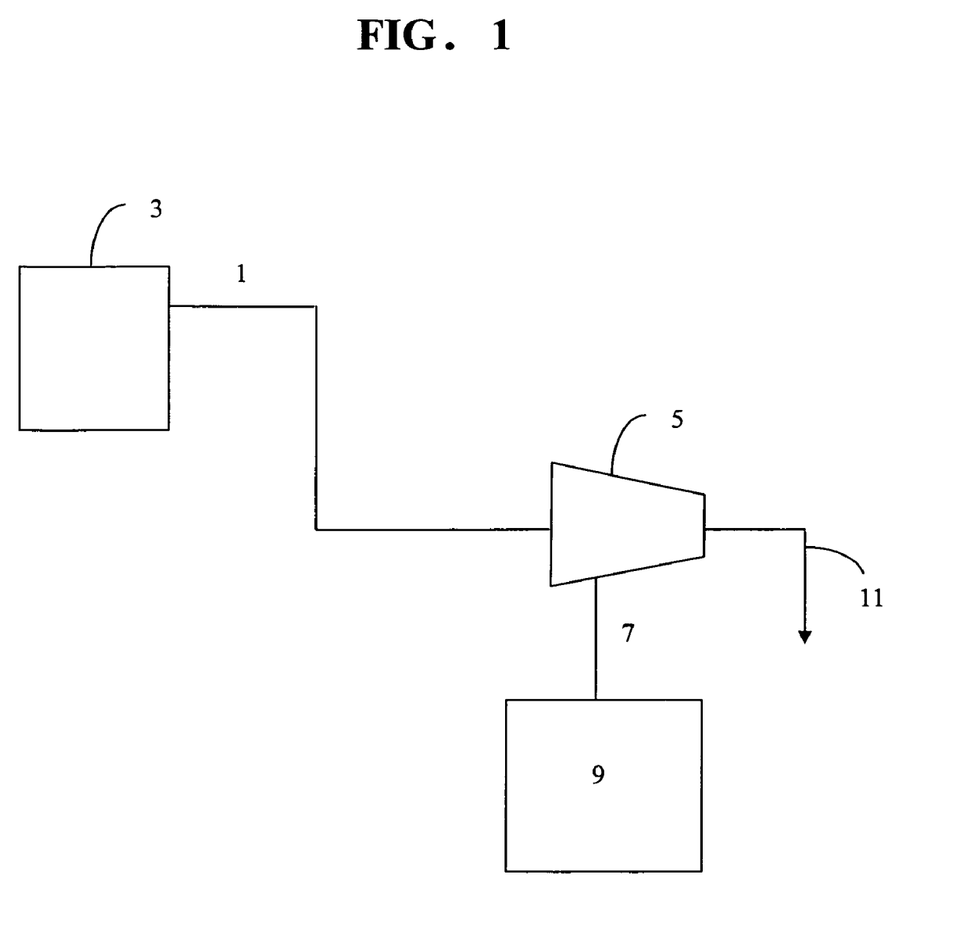
FIG. 1 is a schematic representation a system for producing polymer blends described herein.

FIG. 1 depicts an exemplary system for producing the polymer blends described herein. A first stream 1 comprising a solution of the first polymer is removed from reactor 3 and directed to a devolatilizer means 5. The devolatilizer means may be any suitable devolatilizer apparatuses used to remove solvents from polymer containing streams.

In other embodiments, it has been discovered that beneficial polymer blend characteristics may achieved by producing polymer blends in a devolatizer regardless of the Shore A hardness characteristics of the resulting polymer blends. The benefits are possible because of the intimate blending made possible through the use of a devolatizer as the blending vessel.

In the embodiment depicted, the first stream 1 includes the first polymer dissolved in at least one solvent at a lower limit of 15 wt. %, 20 wt. %, or 25 wt. % to a higher limit of the solvent of 95 wt. % or 85 wt. % or 75 wt. % or 65 wt. %. The at least one solvent may be a conventional hydrocarbon solvent such as a mixture of $C_4$ to $C_9$ acyclic and cyclic hydrocarbons. In certain embodiments, the at least one solvent is selected from solvents comprising greater than 93% of acyclic $C_6$ hydrocarbons used in solution phase polymerization. While, in the embodiment depicted, the solvent is provided in the first stream incorporating the first polymer, it is understood, in other embodiments, that all or a portion the solvent may be provided in the stream 7, described hereinafter, incorporating the second polymer. Alternatively, all or a portion the solvent may be provided to the devolatizer independently of the streams incorporating the first polymer and the second polymer. The first stream 1 may be taken directly from the polymerization reactor 3 or from a polymer finishing apparatus such as another devolatilizer upstream from devolatilizer 5. Once in devolatilizer 5, the first stream 1 is subjected to a vacuum force to remove solvents and other volatile materials from the first stream 1. The vacuum force may be from a lower limit of 0.01 kPa to a higher limit of 150 kPa. The lower limit may be less than 0.1 kPa, less than 0.5 kPa, less than 0.8 kPa, less than 1 kPa, less than 2 kPa, or less than 3 kPa. The higher limit for the vacuum force may be less than 5 kPa, less than 7 kPa, less than 10 kPa, less than 20 kPa, less than 50 kPa, or less than 100 kPa. In one embodiment, the vacuum force may range from about 2.66 kPa to about 6.66 kPa. In one embodiment, temperatures within the devolatilizer may range from about 180° C. to about 220° C. In other embodiments, temperatures within the devolatilizer range from about 190° C. to about 215° C. In still other embodiments, temperatures within the devolatilizer range from about 190° C. to about 200° C.

While in devolatilizer means 5, the first stream 1 is combined with a molten stream 7 containing the at least one additional polymer. In the embodiment depicted, stream 7 is supplied to devolatilizer means 5 through a metering device capable of delivering a measured and controlled amount of a molten polymer at a specific rate. An example of such a device is an extruder 9. This configuration of an extruder placed to deliver the second polymer to the devolatilizer is commonly referred to as the side arm extruder. The blended polymer streams are then removed from devolatilizer means 5 as stream 11 for additional processing such as finishing and pelletization in accordance with conventional processes.

In certain embodiments, the polymer blends incorporating the first polymer and the second polymer display an enhanced rate of hardening of the polymer blend, as measured by the Shore A hardness, compared to the rate of hardening of the first polymer alone. In certain embodiments, following creation of the polymer blends and pellets produced from the polymer blends, the polymer blends may be subjected to additional process steps facilitate the crystallization of the blends and pellets to achieve higher Shore A harness values rapidly following removal from the internally agitated mixing means.

In certain exemplary processes, after removal from the internally agitated mixing means, or after production of pellets from the polymer blends, the polymer blends or pellets may be maintained at a temperature of at least 5° C., at least 10° C., at least 15° C., at least 20° C., or at least 25° C. below the DSC melting point of the first polymer component. Under these range of conditions, in various embodiments, the Shore A hardness of the blends reaches at least 35, at least 40, at least 45, at least 50, at least 55, or at least 60 in time periods of 1 minute, 3 minutes, 10 minutes, 60 minutes, or 180 minutes. Generally, the temperatures identified above with respect to the melting point of the first polymer component fall with the range of about 10° C. to about 40° C. However, the temperatures identified above may fall outside of this range.

The blends and pellets may be maintained at these temperatures and temperature ranges by immersing them in a cold water bath, or a bath containing a fluid which is not a solvent for the polymeric components (e.g., ethylene glycol for polyolefins) or a finely divided solid capable of heat conduction (e.g glass beads or sand) and at the predetermined temperature, or exposing them to chilled air or exposing them to a fluid which boils at the predetermined temperature (e.g., fluorocarbons).

In certain embodiments, the ratio of the Shore hardness of the blend to the Shore hardness of the first polymer component, where both are maintained at the same temperature and measured at identical times after cooling to the designated temperature, within experimental accuracy, are at least 1.1, at least 1.3, at least 1.5, at least 1.7, at least 2.0, at least 3.0, or at least 3.5.

The first polymer component and the second polymer component may be provided in the blends described herein over a variety of concentrations. In certain embodiments, the resultant polymer blends incorporate the first polymer and the second polymer in weight ratios of the first polymer to the second polymer of less than 500, less than 200, less than 150, less than 100, less than 75, less than 35, less than 15, less than 10, less than 7 less than 5, less than 3, and less than 2. In still another embodiment, the range of the ratio of the first polymer to the second polymer is less than 35.

In certain embodiments, the first polymer component and the second polymer component are combined in the presence of at least one solvent in an internally agitated mixing means, as described above, over the wide variety of relative proportions discussed in the preceding paragraph. The at least solvent may be a conventional hydrocarbon solvent such as a mixture of $C_4$ to $C_9$ acyclic and cyclic hydrocarbons. In certain embodiments, the at least one solvent is selected from hydrocarbon solvents comprising greater than 93% of acyclic $C_6$ hydrocarbons used in solution phase polymerization. The concentration of the at least one solvent may also vary over a wide range.

In certain embodiments, the first polymer component, the second polymer component, and the at least one solvent are combined in an internally agitated mixing means in proportions of about 15 parts by weight to about 95 parts by weight of the first polymer component; from about 0.01 parts by weight to about 47.5 parts by weight of the second polymer component; and from about 5 parts by weight to about 85 parts by weight of the at least one solvent. In other embodiments, the first polymer component, the second polymer component, and the at least one solvent are combined in an internally agitated mixing means in proportions of about 30 parts by weight to about 95 parts by weight of the first polymer component; from about 5 parts by weight to about 30 parts by weight of the second polymer component; and from about 10 parts by weight to about 85 parts by weight of the at least one solvent. In still other embodiments, the first polymer component, the second polymer component, and the at least one solvent are combined in an internally agitated mixing means in proportions of about 60 parts by weight to about 95 parts by weight of the first polymer component; from about 5 parts by weight to about 15 parts by weight of the second polymer component; and from about 15 parts by weight to about 85 parts by weight of the at least one solvent.

In certain embodiments, all or a portion of the at least one solvent may be provided to the internally agitated mixing means in a stream comprising the first polymer component. In other embodiments, all or a portion of the at least one solvent may be provided to the internally agitated mixing means in a stream comprising the second polymer component. In additional embodiments, a portion of the solvent may be provided to the internally agitated mixing means in both a stream comprising the first polymer component and a stream comprising the second polymer component. In still other embodiments, all or a portion of the at least one solvent may be provided to the internally agitated mixing means in a stream independent of the first polymer component and the second polymer component. Finally, in certain embodiments, portions of the at least one solvent may be provided in the first polymer component stream, the second polymer component stream, and in a stream independent of the first and second polymer components.

In certain embodiments, at least 50 wt. % of the at least one solvent is provided to the internally agitated mixing means in a stream comprising the first polymer component. In other embodiments, at least 75 wt. % of the at least one solvent is provided to the internally agitated mixing means in a stream comprising the first polymer component. In still other embodiments, at least 90 wt. % of the at least one solvent is provided to the internally agitated mixing means in a stream comprising the first polymer component. In additional embodiments, all of the at least one solvent is provided to the internally agitated mixing means in a stream comprising the first polymer component.

The following provides more detailed information regarding the first and second polymer components and additives that may be included in the polymer blends described herein.

First Polymer Component (FPC)

The following is a description of polymeric materials that may be selected as the first polymer component (FPC") in certain embodiments of the polymer blends described herein. The FPC has crystalline regions interrupted by non-crystalline regions. The non-crystalline regions may result from regions of non-crystallizable polypropylene segments and/or the inclusion of comonomer units. The crystallinity and the melting point of the FPC are reduced compared to highly isotactic polypropylene by the introduction of errors in the insertion of propylene and/or by the presence of comonomer.

In one embodiment, the FPC comprises at least 75 wt. % of propylene-derived units. In another embodiment, the FPC comprises from 75 wt. % to 95 wt. % of propylene-derived units. In still another embodiment, the FPC comprises from 80 wt. % to 90 wt. % of propylene-derived units.

In one embodiment, the FPC has an MFR of about 0.5 to about 200. In another embodiment, the FPC has an MFR of about 1 to about 100. In still another embodiment, the FPC has an MFR of about 1 to about 50.

In one embodiment, the FPC has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0.

In one embodiment, the FPC has a Shore A hardness of less than about 90. In another embodiment, the FPC has a Shore A hardness of about 45 to about 90. In still another embodiment, the FPC has a Shore A hardness of about 50 to about 75.

In one embodiment, the propylene-derived units of the FPC have an isotactic triad fraction of about 65% to about 99%. In another embodiment, the propylene-derived units of the FPC have an isotactic triad fraction of about 70% to about 98%. In still another embodiment, the propylene-derived units of the FPC have an isotactic triad fraction of about 75% to about 97%.

The crystallinity of the FPC may be expressed in terms of heat of fusion. In certain embodiments, the FPC has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g. Without being bound by theory, it is believed that the FPC described herein has generally isotactic crystallizable propylene sequences, and the heats of fusion described above are thought to result from melting of these crystalline segments. In one embodiment, the FPC has a heat of fusion of less than 60 J/g. In one embodiment, the level of crystallinity of the FPC is also reflected in a lower melting point.

In some embodiments, the crystallinity of the FPC is reduced by the copolymerization of propylene with limited amounts of one or more comonomers selected from: ethylene, $C_4$-$C_{20}$ alpha-olefins, and polyenes. In one embodiment, the FPC comprises at least 5 wt. % of the alpha-olefin comonomer units. In another embodiment, the FPC comprises about 10 wt. % to about 20 wt. % of the alpha-olefin comonomer units. In another embodiment, the FPC comprises from about 75 wt. % to about 95 wt. % propylene-derived units and from about 5 wt. % to about 25 wt. % of the ethylene-derived units. In still another embodiment, the FPC comprises from about 80 wt. % to about 95 wt. % propylene-derived units and from about 5 wt. % to about 20 wt. % the ethylene-derived units. In an additional embodiment, the FPC comprises at least 70 wt. % of propylene-derived units and about 5.0 wt. % to about 30.0 wt. % of ethylene-derived units. In certain embodiments, the FPC comprises from 6 wt. % to 15 wt. % of ethylene-derived units. In other embodiments, the FPC comprises from 8 wt. % to 12 wt. % of ethylene-derived units. In additional embodiments, the FPC comprises from 8.5 wt. % to 10.5 wt. % of ethylene-derived units. In still other embodiments, the FPC comprises from 8.5 wt. % to 10 wt. % of ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbomadiene, methyl-tetrahydroindene, dicyclopentadiene, bicyclo-(2.2.1)-hepta-2,5-diene, alkenyl norbornenes, alkylidene norbornenes, cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo (A-11,12)-5,8-dodecene.

In one embodiment, the FPC incorporates from about 1 wt. % to about 12 wt. % of polyene-derived units, based on the combined weight of the propylene-derived units and the alpha-olefin-derived units, if any. In another embodiment, the FPC incorporates from about 1.0 wt. % to about 9.0 wt. % of polyene-derived units, based on the combined weight of the propylene-derived units and the alpha-olefin-derived units, if any. In another embodiment, the FPC incorporates from about 2.0 wt. % to about 7.0 wt. % of polyene-derived units, based on the combined weight of the propylene-derived units and the alpha-olefin-derived units, if any. In yet another embodiment, the FPC incorporates from about 3.0 wt. % to about 5.0 wt. % of polyene-derived units, based on the combined weight of the propylene-derived units and the alpha-olefin-derived units, if any.

In one embodiment, the polyene-derived units are derived from 5-ethylidene-2-norbornene. In another embodiment, the polyene-derived units are derived from 5-vinyl-2-norbornene. In still another embodiment, the polyene-derived units are derived from divinyl benzene.

The polymer blends described herein are not limited by any particular polymerization method for preparing the FPC of the invention, and the polymerization processes described herein are not limited by any particular type of reaction vessel.

In one embodiment, the catalyst system used to produce the FPC includes one or more transition metal compounds and one or more activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. Multiple activators may be used, including using mixtures of alumoxanes or aluminum alkyls with ionizing activators. In other embodiments, the methods and catalyst systems disclosed in U.S. patent application Ser. No. 20040024146 published Feb. 5, 2004 may be used to produce the FPC. In still other embodiments, the FPC may be produced using catalyst systems such as the nonmetallocene, metal-centered, heteroaryl ligand catalyst systems as described in U.S. patent application Ser. No. 20030204017 published Oct. 30, 2003.

One or more reactors in series or in parallel may be used in the present invention. The catalyst component and activator may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added either to the first reactor in the series or to both reactors with one component being added to first reaction and another component to the other reactors.

Exemplary FPC's are commercially available from ExxonMobil Chemical under the tradename Vistamaxx™ and from The Dow Chemical Company under the tradename Versify™.

For further general process condition information suitable for use in preparing the FPC's, see U.S. Pat. No. 5,001,205 and PCT publications WO 96/33227 and WO 97/22639. For further information on gas phase polymerization processes, see U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. For information relating to methods of introducing liquid catalyst systems into fluidized bed polymerizations into a particle lean zone, see U.S. Pat. No. 5,693,727. For further information on slurry polymerization processes, see U.S. Pat. Nos. 3,248,179 and 4,613,484. PCT publication WO 96/08520 and U.S. Pat. No. 5,712,352 describe a polymerization process operated in the absence of or essentially free of any scavengers, although the use of scavengers is contemplated for producing the FPC described herein.

Second Polymer Component (SPC)

The following is a description of the second polymer component ("SPC") suitable for use in certain embodiments of the polymer blends described herein. The SPC may be propylene homopolymer or copolymer. The polypropylene used in the blends described herein may vary widely in form. For example, substantially isotactic polypropylene homopolymer can be used or the polypropylene can be in the form of a copolymer containing equal to or less than about 10 weight percent of other monomer, i.e., at least about 90% by weight propylene. Further, the polypropylene can be present in the form of a graft or block copolymer, in which the blocks of polypropylene have substantially the same stereoregularity as the propylene-alpha-olefin copolymer, so long as the graft or block copolymer has a sharp melting point characteristic of the stereoregular propylene sequences that is above about 110° C. in one embodiment, and above 115° C. in another embodiment and, in still another embodiment, above 130° C. The SPC is predominately crystalline, i.e., it has a melting point generally greater than about 110° C. in one embodiment, greater than about 115° C. in a second embodiment, and greater than about 130° C. in a third embodiment. The SPC may be a combination of homopolypropylene, and/or random, and/or block copolymers as described herein. When the SPC is a random copolymer, the percentage of the copolymerized alpha-olefin in the copolymer is, in general, up to about 9% by weight, in other embodiments, about 2% to about 8% by weight and about 2% to about 6% by weight. In certain embodiments, the alpha-olefins contain 2 or from 4 to about 12 carbon atoms. In one embodiment, the alpha-olefin is ethylene. One, or two or more alpha-olefins can be copolymerized with propylene.

Exemplary alpha-olefins may be selected from the group consisting of: ethylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1. There is no particular limitation on the method for preparing this propylene polymer component of the invention. However, in general, the polymer is a propylene homopolymer obtained by homopolymerization of propylene in a single stage or multiple-stage reactor. Copolymers may be obtained by copolymerizing propylene and an alpha-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

Alternatively, the SPC may be selected from low density polyethylenes, high density polyethylenes, polystyrenes, polyamides, polycarbonates, and polyesters.

Additives

The polymer blends describe herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention.

It will be appreciated that other additives may be employed to enhance properties of the polymer blends. As is understood by those skilled in the art, the polymer blends may be modified to adjust the characteristics of the blend as desired.

In one embodiment, the polymer blends described herein incorporate about 1 wt. % to about 25 wt. % of a tackifier resin. In another embodiment, the polymer blends described herein incorporate about 2 wt. % to about 20 wt. % of a tackifier resin. In still another embodiment, the polymer blends described herein incorporate about 3 wt. % to about 15 wt. % of a tackifier resin.

Adding antioxidants to the polymer blends described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

The polymer blends described herein may include one or more non-functionalized plasticizers ("NFP's") where the non-functionalized plasticizer has a kinematic viscosity ("KV") of 2 cSt or more at 100° C. For purposes of this disclosure, if the NFP has a flash point of less than 100° C. it is defined to have a KV at 100° C. of less than 2 cSt. In one embodiment, the non-functionalized plasticizer is polyalphaolefin oligomers of $C_5$ to $C_{14}$ olefins having a Kinematic viscosity of 10 cSt or more at 100° C. and a viscosity index of 120 or more. In one embodiment, the non-functionalized plasticizers incorporate oligomers of $C_5$ to $C_{14}$ olefins having a viscosity index of 120 or more. In another embodiment, the non-functionalized plasticizers include oligomers of $C_6$ to $C_{14}$ olefins having viscosity index of 120 or more. In still another embodiment, the non-functionalized plasticizers include linear and/or branched paraffinic hydrocarbon compositions produced by one or more gas to liquids process having a number average molecular weight of 500 to 20,000. For additional information regarding non-functionalized plasticizers, see PCT published application WO 04/014998.

In one embodiment, the polymer blends described herein incorporate form about 1 wt. % to about 95 wt. % of one or more non-functionalized plasticizers having a kinematic viscosity ("KV") of at least 2 cSt at 100° C. In another embodiment, the polymer blends described herein incorporate form about 5 wt. % to about 85 wt. % of one or more non-functionalized plasticizers having a kinematic viscosity ("KV") of at least 2 cSt at 100° C. In still another embodiment, the polymer blends described herein incorporate from about 5 wt. % to about 75 wt. % of one or more non-functionalized plasticizers having a kinematic viscosity ("KV") of at least 2 cSt at 100° C. In one embodiment, the flashpoint of the non-functionalized plasticizers is at least 200° C. In another embodiment, the flashpoint of the non-functionalized plasticizers is at least 195° C. In still another embodiment, the flashpoint of the non-functionalized plasticizers is at least 190° C.

In one embodiment, the polymer blends described herein include about 1 wt. % to about 60 wt. % of an additive selected from the group consisting of a filler, a pigment, a coloring agent, a processing oil, a plasticizer, and mixtures thereof. In another embodiment, the polymer blends described herein include about 5 wt. % to about 50 wt. % of an additive selected from the group consisting of a filler, a pigment, a coloring agent, a processing oil, a plasticizer, and mixtures thereof. In still another embodiment, the polymer blends described herein include about 10 wt. % to about 40 wt. % of an additive selected from the group consisting of a filler, a pigment, a coloring agent, a processing oil, a plasticizer, and mixtures thereof.

The additives may be provided in the FPC or the SPC by any suitable process. Alternatively, the additives may be provided in the blends during the blending process by inclusion of the additives in the internally agitated mixing means used to produce the blends as described above. The methods used to provide the additives will vary in accordance with the additives selected, the equipment used.

Experimental Evaluations

Definitions and Test Methods

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt. % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt. %=82.585–111.987X+30.045$X^2$, where X is the ratio of the peak height at 1155 $cm^{-1}$ and peak height at either 722 $cm^{-1}$ or 732 $cm^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by $H^1$ or $^{13}C$ nuclear magnetic resonance (NMR) have been established. In embodiments described herein where the polyene is ENB, the amount of polyene present in the polymer can be measured using ASTM D3900.

Isotactic: The term "isotactic" is defined herein as a polymer sequence in which greater than 50% of the pairs of pendant methyl groups located on adjacent propylene units, which are inserted into the chain in a region regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172.

Tacticity Index: The tacticity index, expressed herein as "m/r", is determined by $^{13}$C nuclear magnetic resonance (NMR). The tacticity index m/r is calculated as defined in H. N. Cheng, *Macromolecules*, 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

Melting point and heat of fusion: The melting point (Tm) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., New York, (1975) 287-368; Rodriguez, F., *Principles of Polymer Systems* 3rd ed., Hemisphere Pub. Corp., New York, (1989) 155-160; U.S. Pat. No. 4,540,753; Verstrate et al., *Macromolecules*, vol. 21, (1988) 3360; and references cited therein.

Mooney viscosity: Mooney viscosity, as used herein, is measured as ML(1+4) @ 125° C. according to ASTM D1646.

Melt flow rate and melt index. The determination of the Melt Flow rate (MFR) and the Melt Index of the polymer is according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190° C. This data is referred to as MI@190° C. As used herein, MFR@230° C. refers to the MFR of the composition comprising the propylene-based elastomer, optional crystalline polymer component, and optional additives other than curative additives.

Shore A and Shore D hardness The determination of the Shore A and Shore D hardness of the polymer is according to ASTM D 2240. In this version of the method a portion of the sample is tested at room temperature. The data is recorded 15 seconds after the indentation is created in the sample. As used herein, Shore A hardness is the Shore A hardness of the crosslinked composition.

Stress strain measurements: The stress-strain elongation properties of the first polymer and the blends of the first and second polymer components described herein can be measured according to the ASTM D790 procedure described as follows. Dumbbell shaped samples were fabricated from a pad molded into dimensions of 6 in×6 in×0.125 in and removed with a die. The stress strain evaluation of the samples was conducted on an Instron 4465 tester determined for blends at 20 in/min, made by Instron Corporation of Canton, Mass. The digital data was collected in a file collected by the Series IX Material Testing System available from Instron Corporation and analyzed using Excel, a spreadsheet program available from Microsoft Corporation of Redmond, Wash.

Tension set: Tension set can be measured according to the general ASTM D790 procedure by uniaxially deforming a sample to different elongations. In the particular example of this determination the sample (in the shape of a dumbbell, immediately above) is mounted on an Instron 4465 tester and elongated to 200% elongation. The sample is allowed to retract at the same rate till the retractive force is zero. The length of the polymer sample in the extension zone (which is typically the length of the dumbbell minus the length of samples encompassed in the grips and thus not able to distend) is measured to be L1. This sample is extended to a 200% extension for a total length in the deformation zone of 3L1 and the sample is allowed to retract to at the same rate till the retractive force is zero. The length of the sample in the extension zone at this point is L2. The tension set is defined as 100*(L2−L1)/(L1) as a percentage.

EXAMPLES

The following components were incorporated into polymeric materials and evaluated as set forth in Tables IA and IB below.

ESC Achieve 3854 (34 MFR) is an isotactic polypropylene satisfying the criteria of a second polymer component and is commercially available from ExxonMobil Chemical, Houston, Tex.

Irganox 1076 is an antioxidant is commercially available from Novartis Corporation.

VM2000 is a propylene ethylene copolymer containing 15 wt. % ethylene, having a 20 MFR at 223° C., satisfies the criteria for a first polymer component as described herein and is available from ExxonMobil Chemical, Houston, Tex.

Experimental second polymer component A (Polymer A in Table 1B) was produced according to the following general procedure. The propylene-based elastomers in the following examples can be prepared according to the following procedure. In a 27 liter continuous flow stirred tank reactor equipped with a dual pitch blade turbine agitator, 92 Kg of dry hexane, 34 Kg of propylene and 0.45 Kg of ethylene are added per hour. The reactor is agitated at 650 rpm during the course of the reaction and is maintained liquid full at 11.03 kPa pressure (gauge) so that all regions in the polymerization zone have the same composition during the entire course of the polymerization. A catalyst solution in toluene of 1.5610-3 grams of dimethylsilylindenyl dimethyl hafnium and 2.4210-3 grams of dimethylanilinium tetrakis (heptafluoronaphthyl) borate are added at a rate of 6.35 ml/min to initiate the polymerization. An additional solution of tri-n-octyl aluminum (TNOA) is added to remove extraneous moisture during the polymerization. The polymerization is conducted at approximately 59° C. and the temperature is maintained during the polymerization by adding pre-chilled hexane at a temperature between −3° C. and 2° C. The polymerization typically leads to the formation of 9.5 Kg of polymer per hour. The polymer is recovered by two stage removal of the solvent, first by removing 70% of the solvent using a lower critical solution process as described in WO0234795A1, and then removing the remaining solvent in a LIST devolatization extruder. The polymer is recovered as pellets of about 3.17 mm to about 6.35 mm in principal axes.

Polymer A had an ethylene content of 4.2 wt. %, 5.6 MFR and had a melting point by DSC of 106° C.

Polymer blends reported in the Tables below were made by taking the measured quantities of the polymers reported below and blending them at 180° C. to 200° C. in 250 cc Brabender mixer for 10 minutes under high shear conditions. The blends are made by mixing the weights of the polymers in the first two rows expressed in grams. The polymer mixture was pressed into a 20.3 cm×20.3 cm pad, approximately 3.17 mm thick at 200° C. for 20 minute under a Teflon sheet and removed and immediately cooled in water to the desired temperature as in the tables below. The Shore hardness of the sheet (Shore A) was measured according to the time schedule shown in the Tables below.

TABLE 1A

Achieve 3854 (SPC)

| | Example- | | | | | | | |
|---|---|---|---|---|---|---|---|---|
| | 1 | 2 | 3 | 4 | 5 | 6 | 7 | 8 |
| FPC -VM2000 | 225.0 | 237.5 | 225.0 | 212.5 | 240.0 | 242.5 | 245.0 | 247.5 |
| SPC -Achieve 3854 | | 12.5 | 25.0 | 37.5 | 10.0 | 7.5 | 5.0 | 2.5 |

Shore A Hardness @ 22° C.

| | | | | | | | | |
|---|---|---|---|---|---|---|---|---|
| 1 min | 28 | 55 | 58 | 60 | 49 | 48 | 46 | 43 |
| 10 min | 26 | 56 | 56 | 58 | 50 | 49 | 47 | 44 |
| 20 min | 31 | 58 | 58 | 61 | 51 | 50 | 48 | 45 |
| 30 min | 30 | 58 | 59 | 63 | 52 | 51 | 49 | 48 |
| 40 min | 32 | 58 | 60 | 63 | 54 | 53 | 49 | 48 |
| 50 min | 32 | 60 | 61 | 65 | 58 | 56 | 53 | 52 |
| 1 hr | 35 | 60 | 61 | 65 | 62 | 61 | 58 | 55 |
| 1 hr 10 min | 36 | 60 | 61 | 65 | 63 | 61 | 59 | 58 |
| 1 hr 20 min | 35 | 60 | 62 | 66 | 65 | 61 | 59 | 58 |
| 1 hr 30 min | 35 | 61 | 62 | 66 | 65 | 61 | 60 | 59 |
| 1 hr 40 min | 35 | 61 | 62 | 67 | 65 | 62 | 60 | 61 |
| 1 hr 50 min | 35 | 61 | 62 | 68 | 65 | 64 | 63 | 62 |
| 2 hr | 35 | 61 | 62 | 68 | 66 | 65 | 63 | 63 |
| 2 hr 10 min | 35 | 61 | 62 | 68 | 66 | 66 | 65 | 63 |
| 3 hr 10 min | 44 | 61 | 62 | 68 | 68 | 66 | 65 | 62 |
| 4 hr 10 min | 53 | 65 | 67 | 70 | 69 | 66 | 65 | 62 |
| 5 hr 10 min | 55 | 65 | 67 | 70 | 69 | 67 | 66 | 63 |
| 24 hr | 59 | 69 | 73 | 76 | 70 | 67 | 66 | 63 |
| 48 hr | 65 | 69 | 73 | 76 | 70 | 68 | 66 | 64 |
| 96 hr | 65 | 68 | 75 | 80 | 70 | 68 | 66 | 64 |

Shore Hardness @ 0° C.

| | | | | | | | | |
|---|---|---|---|---|---|---|---|---|
| 1 min | 22 | 41 | 43 | 45 | 38 | 36 | 25 | 20 |
| 10 min | 28 | 49 | 58 | 63 | 48 | 51 | 39 | 38 |
| 20 min | 36 | 53 | 60 | 66 | 51 | 55 | 49 | 49 |
| 30 min | 38 | 57 | 68 | 68 | 55 | 59 | 52 | 51 |
| 40 min | 43 | 58 | 72 | 68 | 59 | 59 | 62 | 56 |
| 50 min | 45 | 62 | 75 | 70 | 68 | 60 | 62 | 60 |
| 1 hr | 55 | 63 | 73 | 70 | 68 | 62 | 65 | 60 |
| 1 hr 10 min | 56 | 63 | 74 | 71 | 66 | 62 | 67 | 61 |
| 1 hr 20 min | 61 | 65 | 75 | 70 | 65 | 65 | 69 | 63 |
| 1 hr 30 min | 64 | 65 | 75 | 70 | 65 | 65 | 68 | 64 |
| 1 hr 40 min | 64 | 65 | 75 | 70 | 65 | 65 | 68 | 64 |
| 1 hr 50 min | 64 | 68 | 75 | 70 | 68 | 65 | 68 | 64 |
| 2 hr | 64 | 68 | 75 | 70 | 68 | 65 | 68 | 64 |
| Elasticity % | 6 | 19 | 23 | 33 | 15 | 12 | 10 | 8 |

TABLE 1B

Polymer A (SPC)

| | Example | | | | | | |
|---|---|---|---|---|---|---|---|
| | 9 | 10 | 11 | 12 | 13 | 14 | 15 |
| FPC -VM2000 | 237.5 | 225.0 | 212.5 | 240.0 | 242.5 | 245.0 | 247.5 |
| SPC -Polymer A | 12.5 | 25.0 | 37.5 | 10.0 | 7.5 | 5.0 | 2.5 |

Shore A Hardness @ 22° C.

| | | | | | | | |
|---|---|---|---|---|---|---|---|
| 1 min | 46 | 54 | 61 | 42 | 28 | 24 | 22 |
| 10 min | 56 | 60 | 64 | 52 | 45 | 33 | 23 |
| 20 min | 61 | 60 | 66 | 55 | 52 | 41 | 40 |
| 30 min | 61 | 60 | 66 | 55 | 52 | 42 | 41 |
| 40 min | 60 | 61 | 68 | 56 | 54 | 44 | 43 |
| 50 min | 61 | 62 | 70 | 56 | 55 | 52 | 50 |
| 60 min | 62 | 62 | 70 | 57 | 57 | 57 | 55 |
| 70 min | 63 | 63 | 70 | 58 | 57 | 58 | 54 |
| 80 min | 63 | 63 | 70 | 58 | 57 | 59 | 56 |
| 90 min | 64 | 64 | 70 | 57 | 58 | 59 | 55 |
| 100 min | 64 | 63 | 70 | 58 | 59 | 59 | 56 |
| 110 min | 64 | 62 | 69 | 58 | 58 | 60 | 58 |
| 120 min | 63 | 62 | 68 | 59 | 59 | 61 | 58 |
| 2 hr 10 min | 63 | 62 | 68 | 59 | 59 | 62 | 58 |
| 3 hr 10 min | 63 | 62 | 70 | 60 | 59 | 62 | 59 |
| 4 hr 10 min | 64 | 63 | 70 | 61 | 60 | 62 | 60 |

TABLE 1B-continued

<table>
<tr><td colspan="8">Polymer A (SPC)</td></tr>
<tr><td></td><td colspan="7">Example</td></tr>
<tr><td></td><td>9</td><td>10</td><td>11</td><td>12</td><td>13</td><td>14</td><td>15</td></tr>
<tr><td>5 hr 10 min</td><td>65</td><td>65</td><td>71</td><td>62</td><td>61</td><td>63</td><td>61</td></tr>
<tr><td>24 hr</td><td>65</td><td>65</td><td>70</td><td>61</td><td>60</td><td>63</td><td>65</td></tr>
<tr><td>48 hr</td><td>65</td><td>66</td><td>72</td><td>62</td><td>60</td><td>63</td><td>65</td></tr>
<tr><td>96 hr</td><td>65</td><td>66</td><td>72</td><td>63</td><td>61</td><td>63</td><td>65</td></tr>
<tr><td colspan="8">Shore Hardness @ 0° C.</td></tr>
<tr><td>1 min</td><td>42</td><td>50</td><td>57</td><td>30</td><td>30</td><td>21</td><td>26</td></tr>
<tr><td>10 min</td><td>62</td><td>66</td><td>70</td><td>60</td><td>53</td><td>35</td><td>37</td></tr>
<tr><td>20 min</td><td>64</td><td>70</td><td>74</td><td>62</td><td>61</td><td>48</td><td>45</td></tr>
<tr><td>30 min</td><td>66</td><td>70</td><td>72</td><td>63</td><td>61</td><td>54</td><td>59</td></tr>
<tr><td>40 min</td><td>66</td><td>70</td><td>72</td><td>62</td><td>62</td><td>58</td><td>61</td></tr>
<tr><td>50 min</td><td>66</td><td>70</td><td>72</td><td>63</td><td>62</td><td>60</td><td>63</td></tr>
<tr><td>60 min</td><td>66</td><td>70</td><td>72</td><td>63</td><td>62</td><td>62</td><td>63</td></tr>
<tr><td>70 min</td><td>66</td><td>70</td><td>72</td><td>63</td><td>62</td><td>63</td><td>63</td></tr>
<tr><td>80 min</td><td></td><td></td><td></td><td></td><td></td><td>63</td><td></td></tr>
<tr><td>Elasticity %</td><td>22</td><td>26</td><td>37</td><td>17</td><td>15</td><td>13</td><td>7</td></tr>
</table>

As seen in the experimental data set forth in Tables IA and IB, blends incorporating at least one FPC and at least one SPC exhibited Shore A hardness values of greater than 35 over a wide range of FPC to SPC weight ratios and at temperatures of 0° C. and 22° C. Shore A hardness values of greater than 35 were attained after twenty minutes following production at both temperatures, even for blends having FPC to SPC weight ratios up to 99. Conversely, the composition incorporating only the FPC did not attain a Shore A hardness of at least 35 until 60 minutes at 22° C. and 20 minutes at 0° C.

In all cases, addition of small amounts of the SPC lead to a rise in the Shore A hardness values of the blends in very short periods of time. The time periods which were less than 1 minute compared to time periods of greater than 100 minutes required for the same change in the hardness of the FPC alone.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

We claim:

1. A process for the production of a polymer blend comprising:
   (a) providing a first stream comprising a first polymer comprising at least 75 wt. % of propylene-derived units that is at least partially dissolved in at least one solvent to a devolatilizer, where the temperature in the devolatilizer is from about 180° C. to about 220° C.;
   (b) subjecting the first stream to a vacuum force of from 0.01 kPa to 7 kPa in the devolatilizer such that at least 30 wt. % of the solvent is removed from the first stream;
   (c) providing to the devolitilizer a second stream consisting of second polymer selected from the group consisting of polypropylene, low density polyethylenes, a high density polyethylenes, polyamides, polycarbonates, and polyesters; and
   (d) forming a blend of the first polymer and the second polymer in the devolatizer,
   wherein all of the at least one solvent is provided to the mixer in the first stream, wherein the solvent is a mixture of $C_4$-$C_9$ acyclic and cyclic hydrocarbons, and wherein the blend comprises about 15 to about 95 parts by weight of the first polymer, about 0.01 to about 47.5 parts by weight of the second polymer, and about 5 to about 85 parts by weight of the at least one solvent.

2. The process of claim 1 wherein the first polymer comprises at least 75 wt. % of propylene-derived units wherein the propylene-derived units have an isotactic triad fraction of about 65% to about 99% and wherein the first polymer has a heat of fusion of less than 75 J/g, and the second polymer is selected from the group consisting of polypropylene, low density polyethylenes, a high density polyethylenes, polystyrenes, polyamides, polycarbonates, and polyesters.

3. The process of claim 2 wherein the first polymer comprises from about 75 wt. % of to about 95 wt. % of propylene-derived units and from about 5 wt. % to about 25 wt. % of ethylene-derived units.

4. The process of claim 3 wherein the first polymer comprises from about 6 wt. % to about 15 wt. % of ethylene-derived units.

5. The process of claim 3 wherein the first polymer comprises from about 8 wt. % to about 12 wt. % of ethylene-derived units.

6. The process of claim 3 wherein the first polymer comprises from about 8.5 wt. % to about 10.5 wt. % of ethylene-derived units.

7. The process of claim 3 wherein the first polymer comprises from about 8.5 wt. % to about 10 wt. % of ethylene-derived units.

8. The process of claim 2 wherein the first stream is subjected to a vacuum force in the devolatilizer of from about 2.66 kPa to about 6.66 kPa.

9. The process of claim 8 wherein the second polymer is a polypropylene comprising at least 90 wt. % of propylene-derived units and wherein the second polymer has a melting point greater than 110° C.

10. The process of claim 9 wherein the weight ratio of the first polymer to the second polymer in the blend is less than 35.

11. The process of claim 8 wherein the blend is removed from the devolatizer and the blend has a Shore A hardness of at least 35 following removal from the devolatizer.

12. The process of claim 8 wherein the blend is removed from the devolatizer and processed into a plurality of polymer pellets and the pellets have a Shore A hardness of at least 35 within 20 minutes after production.

13. The process of claim 12 wherein the polymer pellets have a Shore A hardness of at least 45 within 3 minutes after production.

14. The process of claim 8 wherein the blend is removed from the devolatizer and maintained at a temperature of at least 50° C. below the melting point of the first polymer for a period of 1 minute to 180 minutes following removal from the devolatizer.

15. The process of claim 2 wherein the blend is removed from the devolatizer and is maintained at a temperature of at least 50° C. below the melting point of the first polymer until the Shore A hardness of the blend is at least 35.

16. The process of claim 15 wherein the blend is maintained at a temperature of at least 50° C. below the melting point of the first polymer by immersing the blend in water.

17. The process of claim 16 wherein the blend is in the form of a plurality of polymer pellets having a diameter of about 0.5 mm to about 10 mm.

18. The process of claim 17 wherein the plurality of polymer pellets have a Shore A hardness of at least 35 within 3 minutes after production when maintained at a temperature at least 50° C. below the melting point of the first polymer.

19. The process of claim 18 wherein the plurality of pellets are coated with a powder comprising a material selected from the group consisting of a wax, a polyethylene, a polypropylene, talc, calcium stearate, and mixtures thereof, after being maintained at a temperature at least 50° C. below the melting point of the first polymer.

20. The process of claim 17 wherein the plurality of pellets have a Shore A hardness of at least 45 within 20 minutes after production when maintained at a temperature at least 50° C. below the melting point of the first polymer.

* * * * *